Oct. 17, 1967  P. V. SNYDER  3,348,024
TOAST TEMPERATURE DETECTOR
Filed Oct. 8, 1964
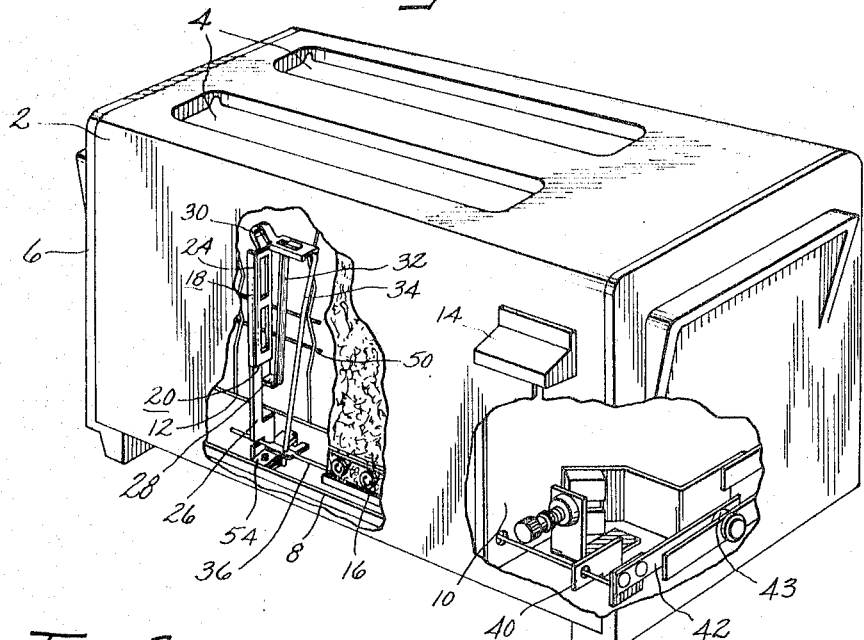
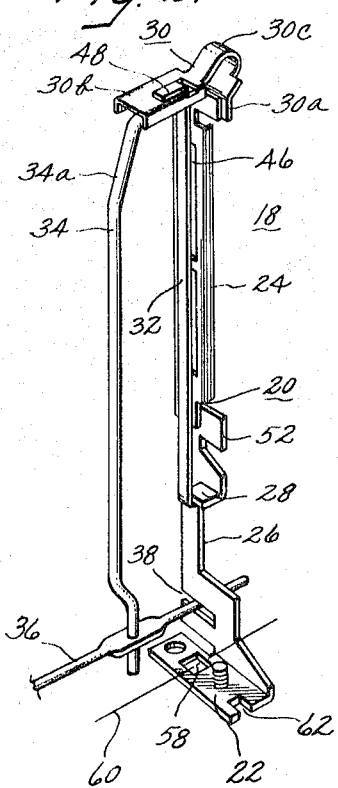
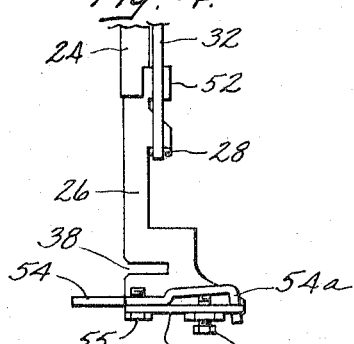
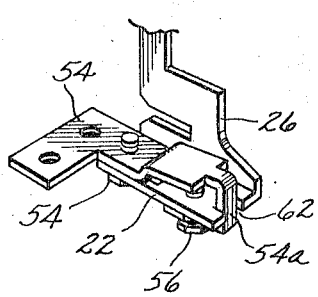
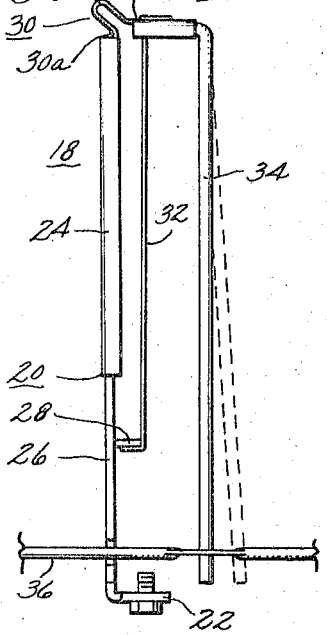
Inventor:
Paul V. Snyder.
by Gordon H. Olson
His Attorney United States Patent Office 3,348,024
Patented Oct. 17, 1967

3,348,024
TOAST TEMPERATURE DETECTOR
Paul V. Snyder, Fullerton, Pa., assignor to General Electric Company, a corporation of New York
Filed Oct. 8, 1964, Ser. No. 402,467
14 Claims. (Cl. 219—413)

ABSTRACT OF THE DISCLOSURE

A bread temperature detecting device is provided for use in an electric toaster having a supporting structure, a space or toast well for receiving a slice of bread to be toasted and heating means positioned adjacent the space. The detector includes an elongated heat sensitive metallic ribbon located between the heater and the toast well and an elongated support positioned in closely spaced, substantially parallel relation to the ribbon. One end of the elongated support is attached to the toaster supporting structure. One end of the ribbon is fixedly attached to the elongated support. The other end of the ribbon is attached to the elongated support by means of an angle leaf spring to place the ribbon under tension. The leaf spring includes one end which is fixedly attached to the support and a movable end to which the ribbon attached. The elongation of the ribbon due to the surface temperature of the toast is mechanically multiplied by means of a multiplier rod connected to the movable end of the spring, which multiplier rod operates a switch actuating rod to initiate the termination of the toasting cycle. The detector arrangement is movably adjustable on the supporting structure so that the detector may be positioned near the bread for effective temperature detection.

This invention relates to an automatic toaster and more particularly to an improved toast temperature detecting mechanism for controlling the duration of the toasting cycle.

Automatic electric toasters have been operated and controlled by a wide variety of devices such as clockwork mechanisms, thermal timers, and detectors which provide a measure of the surface temperature of the food being toasted. Clockwork mechanisms have been unsatisfactory and require thermal compensating devices. The so-called thermal timers operating directly or indirectly by the heat generated from electric current have been widely used although they have certain disadvantages. For example, they are subject to variations in line voltage and line power, and under extreme low voltage conditions they may fail to function entirely. Moreover, compensation is necessary to maintain uniformity of result with repeated consecutive toasting cycles. A more serious drawback is that such controls do not provide for variations in the toasting cycle with differences in the moisture content of the bread, it being necessary for the user to estimate the effect of such variation and adjust the toaster control accordingly.

Mechanisms which provide an accurate measure of the surface temperature of the toast are highly desirable, however, known arrangements have not been completely satisfactory. In one type of temperature detector a bimetal is positioned in close proximity to the bread surface to be subjected to its temperature. A major drawback of this type is that a bimetal having the mass to produce sufficient force to operate a switch or other control requires considerable cooling time between toast cycles which is an undesirable delay. The movement of a bimetal detector is usually an arc in a plane parallel to the bread. Consequently projecting portions of the bread may interfere with the detector movement.

Another type of detector is that in which the elongation of a metal member positioned adjacent the bread is used to indicate the bread surface temperature and to control the toast cycle. This invention relates to an improvement in this type. Prior art detectors of this variety have been rather bulky and unwieldly and have not been easy to install or adjust. Further, they have not provided completely reliable and satisfactory operation.

Accordingly, it is a primary object of this invention to provide an improved toast temperature detecting mechanism.

It is a further object of this invention to provide a toast temperature detector which causes negligible delay time between toast cycles, which produces a relatively high force output and which is not suceptible to fouling due to bread portions restricting detector motion.

It is a further object of the invention to provide an improved toast temperature detector which produces a consistently accurate and reliable indication of the surface temperature of the toast.

Another object of the invention is to provide a compact detector mechanism and an improved simplified arrangement for mounting and adjusting the detector within the toaster.

The bread temperature detecting device of the invention is to be used in an electric toaster having a supporting structure, a space or toast well for receiving a slice of bread to be toasted and heating means positioned adjacent the space. The detector includes an elongated metallic ribbon located between the heating means and the toast well and an elongated support positioned in closely spaced substantially parallel relation to the ribbon. One end of the support is attached to the toaster supporting structure. The ends of the ribbon are attached to the support under tension spring tension. The elongation of the ribbon due to the surface temperature of the toast is mechanically multiplied and this movement utilized to initiate termination of the toasting cycle. The mechanism is compactly arranged and easily adjustable for accurately controlling the duration of a toasting cycle.

Further features, objects and advantages of the invention will become apparent with reference to the following drawings in which:

FIG. 1 is a perspective view of a toaster partially cut away to disclose the improved detector and control mechanism of the invention;

FIG. 2 is an enlarged perspective view of the detector;

FIG. 3 is a side elevational view of the detector indicating the movement produced by the detector;

FIG. 4 is a side elevational view of the lower portion of the detector and the means for adjustably mounting the detector in the toaster.

FIG. 5 is an enlarged perspective view of the adjustable mounting means of FIG. 4.

Referring now to FIG. 1, there is shown a two-slice pop-up style toaster including an outer shell 2 having two bread receiving openings 4 in its upper surface. End panels 6 having insulated handles and feet are attached to the shell 2. These components are secured to a conventional toaster superstructure including a lower side frame member 8 and an L-shaped end support 10. The toaster is provided with conventional bread retaining guard wires 12 defining the space or wells into which the bread is inserted. There is also provided a conventional carriage mechanism (not shown) by which the bread may be raised and lowered. The control for initiating a toasting cycle and for lowering the carriage mechanism is indicated by the external knob 14. Planar heating units 16 are positioned on the outside of guard wires 12 in spaced parallel relation to the wires.

The toast temperature detector 18 of the invention is positioned between one of the heating units 16 and the adjacent bread retaining wire 12. The detector will be briefly described to provide an overall understanding of its operation before going into a detailed explanation of important constructional aspects. An elongated support 20 is shown with its base 22 secured to frame member 8 with the remainder of the support extending upwardly approximately three-quarters of the toaster height. The support is composed of an upper compensator portion 24 and a lower portion or detector bracket 26 welded or otherwise secured together. A tab 28 formed integrally with the bracket 26 extends at right angles to the bracket and is located intermediate its ends.

In accordance with the invention a leaf spring 30 having roughly a right angle configuration has one leg 30a rigidly attached at its lower end to the upper end of compensator 20. The other leg 30b of the spring extends away from support 20 on the same side of the support as tab 28 so that leg 30b and tab 28 are in roughly parallel relation. The basic temperature detecting element is a unique heat sensitive member 32 formed by a thin metallic ribbon. The lower end of the ribbon is welded or otherwise attached to tab 28 as can be seen in the drawing. The upper end of ribbon 32 is secured to spring leg 30b at a point intermediate the outer removable end of the leg and the angled portion 30c of the spring. As can be seen in the drawings the spring is thus suspended in roughly parallel relation to support 20. In a free state, the legs of the spring form an angle greater than a right angle; hence, when secured to the ribbon as shown the spring legs are self-urged apart. Since leg 30a is fixed, there is produced an upward pull or tension on ribbon 32.

An elongated rod 34 has its upper end attached to the outer end of spring leg 30b and its lower end terminating adjacent the base 22 of support 20. The lower end of rod 34 extends through a slot or opening formed in horizontally oriented rod 36 which has one end extending through and supported by a slot 38 in lower bracket portion 26. As can be seen in FIG. 1, the opposite end of rod 36 extends through end plate 10 into a housing located on the right hand end of the toaster containing the electrical controls. The end of the rod also extends through a supporting bracket 40 and contacts a flexible contact arm 42 of a switch 43 controlling a mechanism (not shown) for releasing the toaster carriage and terminating a toasting cycle. The invention is not limited to the particular switching mechanism shown in that various arrangements may be used. As one example of a suitable mechanism, the switch 43 controlled by the rod 36 is normally open; and when closed, it is connected to energize a circuit containing a bimetallic unlatching member which when heated mechanically releases a carriage latch mechanism.

In operation, the ribbon expands or elongates as it senses the temperature of the bread or toast surface as the bread turns to toast. Since ribbon 32 is under tension, its elongation permits leg 30b to arcuately move about an axis approximately located at the angle 30c of spring 30. Since rod 34 is attached to the outer end of spring leg 30b, the rod is moved through a small angle of a very large arc resulting in an essentially transverse or horizontal movement of its lower end, as seen in FIG. 3. This in turn causes horizontal movement of rod 36, which as explained may be used to move contact arm 42 to close switch 43 and initiate termination of the toasting cycle. With the multiplication provided by spring leg 30b and rod 34, only a small change in the length of ribbon 32 is required to produce a significant horizontal movement of rod 36.

Consider now the various elements of the unique detector mechanism in greater detail. Due to raising ambient temperatures for consecutive toast operations, an uncompensated detector would normally terminate toast cycles in intervals of decreasing duration. That is, the ribbon 32 not only senses the temperature of the adjacent bread surfaces, but also senses the temperature of the surrounding air and toaster structure. Therefore, compensation is introduced to prolong the toast cycle to obtain desired toast colors. There are various means which may be employed to provide the necessary compensation, and it should be understood that the invention is not limited to the preferred method illustrated and hereafter described. Since the detector ribbon 32 is mechanically in parallel with support 20, the expansion or elongation of this support decreases ribbon tension. This requires the ribbon to reach higher temperatures on successive toast cycles which is necessary to provide the desired compensation. Thus, the lengths and materials of the detector ribbon and support 20 may be selected so that the support gives a measure of the ambient temperatures. Hence, the difference between the ribbon elongation and the support elongation is a measure of the toast surface temperature.

So that conventional readily available materials may be employed, the support 20 is constructed as a composite of two different materials to obtain the desired compensation. In a production version of the arrangement shown, the upper compensator portion 24 is formed of an iron nickel alloy, while the lower portion on detector bracket 26, is formed of cold rolled steel, which has a higher coefficient of expansion than the compensator. The amount of compensation may of course be adjusted by varying the lengths of the compensator and the bracket. The detector ribbon 32 is preferably formed of stainless steel which has a higher coefficient of expansion than the iron nickel compensator 24. Other materials having high yield strength at operating temperatures may also be employed.

It has been found that the emissivity of the detector components can be varied by varying the color of the components. Thus, by darkening the components, such as by oxidation, they will absorb heat at a faster rate and also lose heat at a faster rate during the cooling cycle. The best operation has been obtained by darkening by oxidizing both the detector ribbon 32 and the compensator 24.

A prime advantage of giving the heat sensitive member 32 a ribbon-like shape is that it has relatively large surface areas to sense the temperature of the toast but yet has very little bulk, with the result that it heats and cools rapidly. This advantage over prior art detectors using wires of circular cross-section as the sensing element is very important from the standpoint of accuracy and of minimizing the delay time between consecutive toasting cycles. In the production version of the detector shown, the ribbon is approximately .010" thick, .078" wide, and 3.3" long. It should be noted that the ribbon 32 is positioned in approximately perpendicular relation to the toast so that an edge surface is closest to the toast. In this manner, both of the large flat surfaces of the ribbon are exposed to the heat given off by the toast surface and only the very small edge surface is positioned to sense the slightly colder surface of the bread which is shaded by the ribbon. Also, positioning the ribbon in this fashion minimizes the shaded area so that more uniform toasting is obtained and more reliable temperature sensing results.

In addition to having rapid heating and cooling of the ribbon 32, it is important that the compensator 24 heat and cool rapidly. At the same time the compensator must have sufficient strength to withstand the forces produced by the spring and the other detector components. Accordingly, the compensator has been given a thin channel shaped cross-section to provide a structure which is lightweight, but yet strong. Two large reactangular holes or windows 46 are formed in the compensator to further reduce its bulk with a minimum of loss of strength.

Turning now to the leaf spring 30, it can be seen that the legs 30a and 30b form approximately a right angle when the spring is assembled and placed under load attached to ribbon 32. However, it should be understood that this is merely the preferred arrangement and springs with varying angles may be employed for successful operation. In its free unassembled state the legs of the spring form an angle of approximately 100° or greater. Preferably, the spring is made of stainless steel approximately .18" thick.

While the spring 30 could be formed with a more conventional right angle, it has been given the looped angular portion shown which forms somewhat of a U-shape with the legs of the U being integral with spring legs 30a and 30b. This U-shape is designed to reduce the gradient of the spring without increasing spring stress, thus improving accuracy and reliability of the detector. Also since the closed end of U-shaped loop 30c is the more precise location of the axis about which the leg 30b pivots, the effective length of the leg 30b is increased and a greater horizontal component of motion at the bottom end of rod 34 is attained.

As a convenient means for attaching the upper end of fribbon 32 to the spring leg 30b, there is provided a hole 48 in leg 30b through which the 90° bent end of ribbon 32 extends. With such an arrangement, the ribbon is mechanically secured to the spring by its bent end as well as by being welded to the spring. To add to the strength of the spring, leg 30b has been given a channel-shaped cross-section similar to that of compensator 24. This construction also provides additional surface by which the upper end of rod 34 may be welded to the outer end of spring leg 30b.

Another advantage of the detector of the invention is that a very small expansion or elongation of the ribbon can be multiplied to provide a considerable movement of a control member such as rod 36 and with substantial force. With the arrangement shown, the over-all magnification of the ribbon expansion is about 18 to 1. The leaf spring leg 30b amplifies the ribbon movement by three, while the extension rod 34 magnifies the leaf spring movement about six times. The approximate maximum elongation of the production version of the detector ribbon shown is .012"; thus, this elongation of the ribbon produces a horizontal movement of the rod 36 of 18 times this amount or .216". However, the expansion of compensator 24 and the section of detector bracket 26 between compensator 24 and tab 28 reduces the motion of rod 36 to about .108". This is ample movement to control flexible contact arm 42 of switch 43.

The force produced by the detector is naturally also important. In the arrangement shown, the ribbon 32 is under more than 4 lbs. of tension produced by lead spring 30. With such tension, it has been measured that the detector produces about one gram of force for each 7½° F. of temperature change. This is more than twice the force produced by typical low mass bimetal detectors used on toasters currently available on the market. Naturally, the force produced by bimetal detectors may be increased by increasing the mass of the bimetal, but this in turn causes slower cooling rates resulting in a greater delay time between consecutive toast cycles.

Another advantage over bimetal detectors is that the ribbon detector is less susceptible to fouling or jamming. To operate effectively, a sensor or detector must be in close proximity with the bread. Most bimetal detectors are positioned so that their arcuate motion sweeps an area parallel to the bread. If a corner from irregular shaped bread protrudes past the bread guard wire 12, it is likely to restrict the deflection of the bimetal. By contrast, the expansion of the ribbon 32 is axial and is no greater than .012". Since the ribbon is under more than 4 lbs. of tension, any portion of the bread that may rest on the ribbon cannot restrict this action. Similarly, any portion of the bread tending to restrict the arcuate motion of the leaf spring is overpowered by the high force developed by the spring. The extension rod 34 which further amplifies the motion of the leaf spring is displaced, as indicated at point 34a FIG. 2, away from the bread so as to be out of reach from ordinary bread that may protrude through the wires 12.

Another feature of the detector is that it provides a very compact easily assembled and adjustable structure which can be simply attached to the lower frame member 8 of the toaster. In accordance with another aspect of the invention the mounting of the detector has been uniquely combined with a simple means for adjusting the position of the detector relative to the bread. It is of course necessary that the ribbon 32 be precisely located to obtain accurate and consistent operation.

To provide this necessary adjustment the base 22 of support 20 has been uniquely formed to cooperate with an adjusting bracket 54. As can be seen from FIG. 5, one end of adjusting bracket 54 is provided with apertures through which suitable fasteners (not shown) may extend for securing the bracket to frame member 8 while a central portion of bracket 54 is secured by fastener 55 to one end of base 22. The inwardly extending end of bracket 54 is angled slightly upwardly so that it is slightly spaced from the end of base 22 as can be seen in FIGS. 4 and 5. A depending tongue 54a formed integrally with the inner end of the bracket cooperates with a slot 62 formed in the end of base 22 to insure angular alignment. An adjusting screw 56 threadably mounted in the inner end of base 22 extends through the base and engages the lower surface of the end of bracket 54. The hole or window 58 formed in the central portion of base 22 weakens the base in that area. With such an arrangement, force applied to base 22 in the area of screw 56 causes the entire detector assembly to pivot about an axis transverse to the base 22 in the weakened area of window 58 as indicated by the line 60 in FIG. 2. The adjustable rotation of the screw 56 is engagement with the end of adjusting bracket 54 provides this necessary adjusting force. Movement of the screw 56 upwardly as viewed in FIG. 4 will cause the detector to pivot slightly in a clockwise direction towards the bread. Counterclockwise movement of the detector is controlled by the spring back of the base material as the direction of the adjusting screw is reversed.

As a reference point for proper positioning of the ribbon 32, there is provided a plurality of thin guide wires 50, as seen in FIG. 1, which extend horizontally between two vertically extending guard wires 12. To serve as the mating positioning surface, bracket 26 is provided with an outwardly extending projection 52 which extends further inwardly than the ribbon 32. The projection is positioned so as to engage one of the guide wires 50. Thus, when the detector assembly is positioned by adjusting screw 56 so that the edge of projection 52 is in light contact with one of the wires 50, the detector is properly aligned.

From the foregoing it can be seen that the detector 18 can be assembled and tested as a separate unit and then simply and easily installed and adjusted in the toaster. Further, the compactness of the assembly should be noticed in that it extends between the heating unit 16 and the guard wires 12 with base portion 22 extending partially beneath the bread receiving well.

Many variations and modifications of the invention will readily come to mind after reading the foregoing description. Accordingly, it is intended that all such variations and modifications which fall within the true spirit and scope of the invention be included within the appended claims.

What is claimed is:

1. In an electric toaster having a supporting structure, means defining a space for receiving a slice of bread to be toasted, and heating means positioned adjacent said space, a bread temperature detecting device comprising: an elongated ribbon located between said heating means and said space; an elongated support positioned in closely spaced substantially parallel relation to said ribbon and having one end attached to said support structure; means attaching the ends of said ribbon to the support including means for maintaining said ribbon under tension;

and means attached to said tensioning means for multiplying the movement of said ribbon and utilizing the movement to initiate termination of a toasting cycle.

2. The appliance of claim 1 including means for adjusting the location of said support and hence the location of the heat sensitive member with respect to said bread receiving space.

3. In an electric food heating appliance, means defining a space for receiving the food; heating means positioned adjacent said space, a food temperature detecting device comprising: an elongated heat sensitive member located between said heating means and said space; an elongated support positioned in closely spaced parallel relation to said heat sensitive member between said space and said heating means; means attaching the ends of said heat sensitive member to said support at spaced locations and including spring means for maintaining said heat sensitive member under tension; means connected to said spring means to multiply the movement of said heat sensitive member as it expands including an elongated rod extending in roughly parallel relation to said heat sensitive member and said support; and means actuated by said rod terminating a toasting cycle.

4. In an electric toaster, a toast temperature detecting device comprising: an elongated heat sensitive member located adjacent the space to be occupied by a slice of bread being toasted; an elongated support positioned in substantially parallel relation to said heat sensitive member; said heat sensitive member having a coefficient of expansion greater than the coefficient of expansion of said support; said support having a tab extending towards said heat sensitive member with one end of the heat sensitive member being connected to the tab; a leaf spring having two legs joined by an angle portion with one leg being attached to said support at a point remote from said tab and with the other leg being movable and extending toward said heat sensitive member; said heat sensitive member having its opposite end attached to said spring at a point between said angle portion and the end of said movable leg; said spring being biased so that the heat sensitive member is maintained under tension whereby the movable leg of the spring moves as the heat sensitive member expands; and means attached to the movable leg of said spring to actuate means for terminating a toasting cycle.

5. In a toaster having a space for positioning a slice of bread to be toasted, a toast temperature detecting device comprising: an elongated support attached to said toaster and positioned adjacent said space; an elongated heat sensitive member positioned in substantially parallel relation to said support adjacent said space; said heat sensitive member having one end connected to said support; a right angle leaf spring having two legs joined by an angle portion with one leg being movable and the other leg being fixed at the end thereof to said support at a point spaced from the connection between the heat sensitive member and the support; said heat sensitive member having its opposite end attached to said movable spring leg at a point between the end of the leg and the angle of the spring; said spring being biased such that the heat sensitive member is maintained under tension so that as the heat sensitive member elongates the movable leg of said spring moves; and means attached to the movable spring leg to actuate means for initiating termination of the toasting cycle.

6. In an electric heating appliance having a space for placing an item to be heated, a temperature detecting device comprising: an elongated heat sensitive member located adjacent the space to be occupied by the item being heated; an elongated support positioned in substantially parallel relation to said heat sensitive member; said support having an outwardly extending tab connected to one end of said heat sensitive member; a leaf spring having one end fixed to said support at a point spaced from said tab and having a movable end extending towards said heat sensitive member; said heat sensitive member having its opposite end attached to said spring at a point between said support and said movable spring end; said spring being biased such that the heat sensitive member is maintained under tension so that as the heat sensitive member elongates said movable spring end moves; and means attached to said movable end to actuate means for terminating a toasting cycle; said support being designed to expand or contract in accordance with the temperature of said appliance in a manner such that the movement of the means attached to the movable end of said spring is essentially only a measure of the surface temperature of the item being heated.

7. In an electric toaster having a supporting structure and a space for receiving a slice of bread to be toasted, a bread temperature detecting device comprising: an elongated metallic ribbon located adjacent said space with an edge surface of the ribbon being closest to said space; an elongated support positioned in substantially parallel relation to said ribbon and having its lower end attached to said supporting structure; said support having an outwardly extending tab connected to the lower end of said ribbon; a right angle leaf spring having one end secured to the upper end of said support and having its other end extending toward said ribbon; said ribbon having its upper end attached to said spring at a point between the angle of the spring and said other end of said spring; said spring being biased upwardly to maintain said ribbon under tension so that as the ribbon elongates said other end of the spring is free to move; a rod attached to said other end of said spring and extending downwardly towards the base of said support; and means actuated by the lower end of said rod for initiating termination of a toasting cycle.

8. In an electric food heating appliance having a space for receiving the food, a food temperature detecting device comprising: an elongated heat sensitive member located adjacent said space; an elongated support positioned in closely spaced parallel relation to said heat sensitive member; means attaching the ends of said heat sensitive member to said support at spaced locations and including means for maintaining said heat sensitive member under tension; means connected to said heat sensitive member and said attaching means to multiply the difference in movement of said support and heat sensitive member; and means actuated by said multiplying means terminating a toasting cycle; said heat sensitive member having a coefficient of expansion higher than said support; said support having one end portion with a coefficient of expansion, different from the coefficient of expansion of the opposite end portion, the dimensions of said portions and their coefficients of expansions being selected so that the support compensates for the ambient temperature of the appliance whereby the heat sensitive member provides an accurate indication of the temperature of the food being heated.

9. In an electric food heating appliance having a space for receiving the food, a food temperature detecting device comprising: an elongated heat sensitive member located adjacent said space; an elongated support positioned adjacent said heat sensitive member; means attaching the ends of said heat sensitive member to said support at spaced locations including means for maintaining said heat sensitive member under tension, means connected to said heat sensitive member and said attaching means to multiply the difference in movement of said support and said heat sensitive member; means actuated by said multiplying means terminating a food heating cycle; and means for adjusting the location of said support relative to the food receiving space.

10. The appliance of claim 9 wherein said adjusting means includes a bracket attached to the food heating appliance extending beneath said food receiving space; a fastening member extending through one end of the bracket and one end of the base of the support to attach the support to the toaster; said base having a weakened section between its ends about which the support can be slightly pivoted, and an adjusting screw extending through the other end of said base to engage said bracket, said bracket and base being oriented such that rotation of said adjusting screw varys the position of said support and said heat sensitive member relative to said food receiving space.

11. In an electric toaster, a toast temperature detecting device comprising: an elongated heat sensitive member located adjacent the space to be occupied by a slice of bread being toasted; an elongated composite support positioned adjacent to said heat sensitive member; said support including a compensator portion and a detector bracket; first means connecting one end of the heat sensitive member to the bracket at a point between the ends of the bracket; second means connecting the other end of said heat sensitive member to the end of said compensator portion remote from said bracket; said second connecting means including means for maintaining the heat sensitive member under tension whereby the second connecting means moves as the heat sensitive member expands; means attached to the second connecting means to actuate means for terminating a toasting cycle in response to the movement of the heat sensitive member; said bracket and said compensator portion having different coefficients of expansion; the dimensions of said compensator portion and said bracket and their coefficients of expansion being selected to compensate for the toaster ambient temperature whereby the movement of the heat sensitive member provides an accurate indication of the surface temperature of the bread being toasted.

12. In a toaster having a frame, means defining a space for positioning a slice of bread to be toasted, and heating means positioned adjacent said space, a toast temperature detecting device located between said space and said heating means comprising: an elongated support having its lower end attached to said toaster frame; an elongated heat sensitive member positioned in substantially parallel relation to said support adjacent said space; said heat sensitive member having its lower end connected to said support at a point intermediate the ends of the support; an angled leaf spring having one end attached to the upper end of the support with the other end of the spring extending away from the support; said heat sensitive member having its upper end attached to said spring at a point between the said other spring end and the angled portion of the spring, said spring being biased such that the heat sensitive member is maintained under tension so that as the heat sensitive member expands said end of said spring moves; and an elongated rod attached to said other end of said spring to multiply movement of the heat sensitive member and control means for terminating the toasting cycle.

13. In an electric toaster having a supporting structure, means defining a space for receiving a slice of bread to be toasted, and heating means positioned adjacent said space, a bread temperature detecting device comprising: an elongated metallic ribbon located between said heating means and said space with an edge surface of the ribbon being closest to said space; an elongated support positioned adjacent said heat sensitive member and having its lower end attached to said support structure, means attaching the ends of said ribbon to said support and including spring means for maintaining said ribbon under tension; and means connected to said tensioning means for amplifying the movement of said ribbon and utilizing the movement to initiate termination of a toasting cycle.

14. In an electric toaster, a toast temperature detecting device comprising: an elongated heat sensitive member located adjacent the space to be occupied by a slice of bread being toasted; an elongated support positioned adjacent said heat sensitive member; one end of said heat sensitive member being connected to said support at a point intermediate the ends of the support; a leaf spring having two legs extending in approximately perpendicular relation and joined by a U-shaped angle portion with one leg being fixed to one end of said support and with the other leg being movable; said heat sensitive member having its opposite end attached to said spring at a point between said angle portion and the end of said movable leg; said spring being biased so that the heat sensitive member is maintained under tension whereby the movable leg of the spring moves as the heat sensitive member expands; and means connected to the movable leg of said spring to actuate means for terminating a toasting cycle.

References Cited
UNITED STATES PATENTS

| 2,570,453 | 10/1951 | Huck | 99—329 |
| 2,800,070 | 7/1957 | Olson et al. | 99—329 |
| 2,906,194 | 9/1959 | Schwaneke | 99—329 |
| 2,910,929 | 11/1959 | Sorenson | 99—329 X |
| 2,951,432 | 9/1960 | Lawser | 99—329 X |
| 3,119,001 | 1/1964 | Andrews | 99—329 X |

RICHARD M. WOOD, Primary Examiner.

C. L. ALBRITTON, Assistant Examiner.